Oct. 10, 1967 MASAJIRO YOSHINAGA 3,345,870
FUEL LEVEL INDICATOR

Filed Nov. 24, 1964 2 Sheets-Sheet 1

United States Patent Office 3,345,870
Patented Oct. 10, 1967

3,345,870
FUEL LEVEL INDICATOR
Masajiro Yoshinaga, Tokyo, Japan, assignor to Yoshinaga
Prince Kabushiki Kaisha, Tokyo, Japan
Filed Nov. 24, 1964, Ser. No. 413,452
Claims priority, application Japan, Nov. 26, 1963,
38/88,404
2 Claims. (Cl. 73—327)

ABSTRACT OF THE DISCLOSURE

A fuel level indicator comprising a transparent member with two or more sloping peripheral surfaces and a colored indicator plate secured in proximity to the top end of the transparent member. The indicator is secured to a mounting bracket within a vessel containing fuel so that the proportion of the colored plate visible to one holding the vessel, by virtue of reflection and/or refraction, is directly related to the amount of fuel within this vessel.

---

This invention relates to indicator means and has particular reference to a device for indicating the amount of liquid fuel inventory in the reservoir of a vessel by changing color.

Indication by color of a fuel level in a vessel, in this case a cigarette lighter, is effected according to the invention by the cooperation of a transparent member having two or more inclined peripheral surfaces for refraction of light and an indicator plate having a suitable color or colors thereon for reflection of light. The transparent member and the indicator plate appear optically either as integrally or as separately installed, depending upon the presence of a liquid fuel in the reservoir of the lighter, which will in turn cause the color to emerge or change. More specifically, the transparent member and the indicator plate appear optically as if they were one and the same body when there is fuel interposed therebetween, thus producing a color visible to the eye. In the absence of fuel, the transparent member and the indicator plate appear optically as if they were separate elements, thereby removing the color indication or changing the color.

In accordance with the invention, it is also possible to indicate the amount of fuel inventory at all points intermediate where the level in the reservoir lies between the transparent member and the indicator plate, thus causing the two different states of indication as aforementioned to appear simultaneously.

These and other advantages of the invention will become more apparent from the following description taken in connection with the accompanying drawings which illustrate a few preferred embodiments of the invention. These embodiments should be considered only as illustrative in nature and not as limiting the invention thereto.

Figure 2:
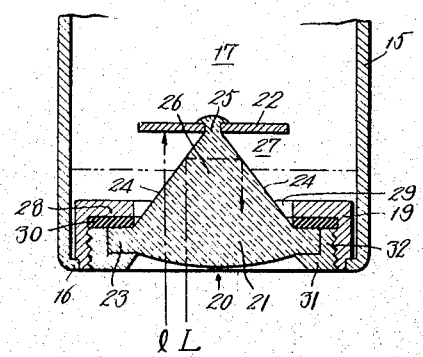
FIG. 2 is a longitudinal cross-sectional side view of the bottom portion of the cigarette lighter including the fuel level indicator.
Figure 3:
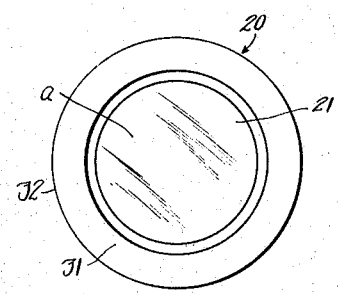
Figure 4:
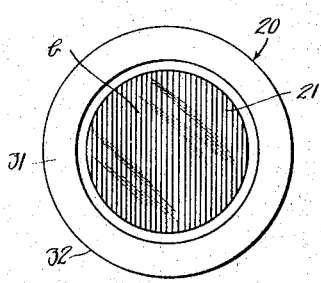
Figure 5:
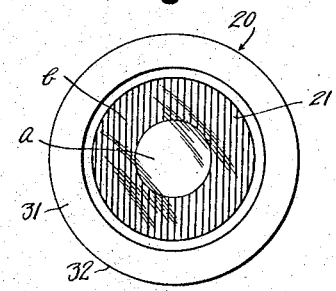
Figure 6:
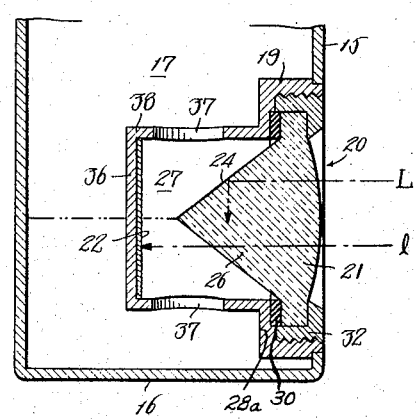
Figure 7:
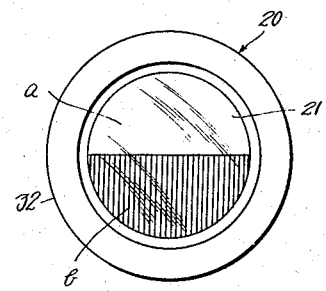
Figure 8:
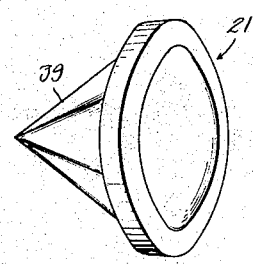
Figure 9:
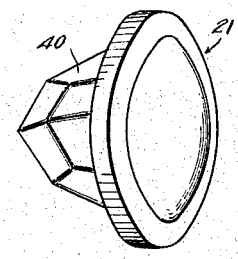
Figure 10:
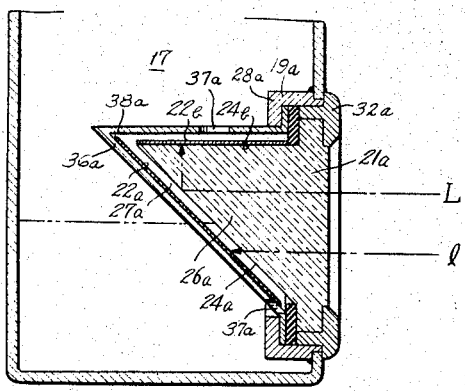
Figure 11:
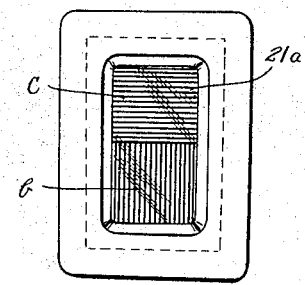

FIGS. 3 through 5, inclusive, illustrate the transparent member in its elevational view; FIG. 3 illustrating the state of the device in which there is no fuel in the reservoir of the lighter; FIG. 4 illustrating the state of the device in which there is a full supply of fuel in the reservoir, and FIG. 5 illustrating the state of the device in which the fuel level is reduced to an intermediate point as indicated by the chain-line in FIG. 2;

FIG. 6 is a longitudinal cross-sectional view of a side wall of the cigarette lighter having the fuel level indicator attached thereto;

FIG. 7 is an elevational view of the fuel level indicator shown as having a level of fuel as high as a lower half portion of the transparent member;

FIG. 8 and FIG. 9, respectively, show modifications of the transparent member constituting the level indicator device;

FIG. 10 is a longitudinal cross-sectional view of side wall of the cigarette lighter having another form of the fuel level indicator attached thereto;

And FIG. 11 is an elevational view of the indicator of FIG. 10 showing the transparent member as indicating the inventory of fuel in the reservoir of the lighter.

Figure 1:
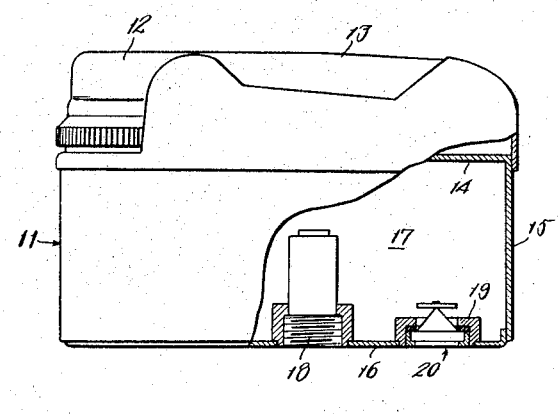
FIG. 1 is an elevational view of the cigarette lighter having at the bottom thereof a fuel level indicator according to the invention, a portion of the lighter being cut away for purposes of illustration.

Reference to FIG. 1 shows the cigarette lighter 11 as comprising a cap 12 adapted to close a flame tip, an ignition lever 13, both mounted on an upper wall 14, a side wall member 15, a bottom wall member 16, a fuel reservoir 17 formed by said walls and a liquefied gas fuel filling valve 18 secured centrally to the bottom wall 16. This conventional type of cigarette lighter structure is further provided with a circular, threaded socket member 19 secured to the bottom wall 16.

A fuel level indicator 20, constructed in accordance with this invention, is journalled in the threaded socket 19 and indicates the level of fuel such as liquefied gas, petroleum benzene and other liquid fuel for lighters, present in reservoir 17.

The fuel level indicator 20 comprises, as shown in FIG. 2, a transparent member 21 of polyacrylate resin or glass and an indicator plate 22 colored in red. The transparent member 21 is provided at the periphery thereof with a circular flange 23 beneath which is formed integrally therewith a conical member 26 having two inclined peripheral surfaces 24 and a projection 25 at the top thereof.

The indicator plate 22 is mounted centrally on the projection 25 and secured to the top end of the conical member 26. Designated at 27 is the space for retaining the fuel between the indicator plate 22 and the inclined surfaces 24 of the cone 26.

The fuel level indicating device 20 comprising the transparent member 21 and the indicator plate 22 is secured to the bottom wall 16 of the cigarette lighter. This is done by placing a suitable packing 30 around the hole 29 of the bracket member 28 with the transparent member 21 and the indicator plate 22 inserted therein, holding the flange member 23 of the transparent member in contact with the packing 30, inserting the ring 32 having a ridge 31 in between the threaded socket 19 and the flange 23, and pressing the ridge 31 against the flange 23. The fuel level indicator 20 thus secured by the threaded socket 19 and the ring 32 to the bottom 16 of the lighter structure is arranged with a surface of the transparent member 21 visibly exposed and with the conical part 26 and the indicator plate situated within the fuel reservoir 17 of the lighter.

The indicating action of the level indicator device 20 takes place in response to the presence or absence of fuel within the space 27 created between the conical part 26 and the indicator plate 22, as seen in FIG. 2.

When the fuel reservoir 17 is empty, the transparent member 21 and the indicator plate 22 appear optically as separate elements because light is caused to refract into L fashion in contact with the inclined surfaces 24 of the conical part 26 and fails to reach the indicator plate 22; that is, the indicator plate 22, in this instance, is optically isolated from the transparent member 21 and hence, cannot present the red color coated thereon. Thus, member 21 appears white to the eye as illustrated in FIG. 3.

When the fuel reservoir 17 is filled with fuel, to a level above plate 22, the transparent member 21 and indicator plate 22 appear optically as if they were one and the same member. This phenomena occurs because the surfaces 24 of the conical part 26 disappear due to the transparency of the liquid fuel present in the space 27 with the result that the light reaches the indicator plate 22 in $l$ fashion without being refracted and the red color on the indicator plate 22 is caused to emerge to the eye as illustrated in FIG. 4.

When the fuel level in the reservoir 17 is reduced to an intermediate point indicator by the chain line in FIG. 2, the foregoing two different modes of indication are concurrently produced. Accordingly, the transparent member 21 and the indicator plate 22 are seen partially as separate elements at a point above the chain line where the space 27 is unfilled, and the inclined surfaces 24 of the conical part 26 is seen, and are seen optically as integrally formed at a point below the chain line where the indicator plate 22 agrees in plane with the level fuel regardless of the gap created therebetween. This is because the light is caused to refract in a substantially $L$ fashion upon contact with the conical part above the fuel level thereby failing to reach the indicator plate 22, while the light is that admitted through the portion of the conical member 26 below the fuel level is directed straight to the colored plate 22 thereby causing the color, in this case red, to become visible.

The above two different sets of indication takes place discriminatively across the level of fuel in the reservoir and are shown as such on the exposed surface of the transparent member 21. This is schematically illustrated in FIG. 5, wherein the white center portion ($a$) of the circle represents the absence of liquid fuel and the red portion ($b$) surrounding the portion ($a$) represents the presence of fuel.

It will be readily understood from the above arrangement that the amount of fuel inventory in the reservoir corresponds to the size of the white portion ($a$) appearing at the exposed surface of the transparent member 21.

FIG. 6 shows a modification of the fuel level indication device according to the invention, which comprises a cylindrical member 38 having a threaded socket 19, a bracket member 28a integrally formed therewith, a partition member 36 and a wall member having a relatively large opening 37. Adhered to the back side of the partition member 36 is an indicator plate 22, while the transparent member 21 is mounted in the bracket member 28a leaving a suitable space 27 in between the transparent member and the indicator plate 22 and secured in place by a clamping ring 32, as shown in FIG. 6.

The operation of this modification is substantially the same as the first embodiment of the invention discussed in connection with FIG. 2. With the fuel level reduced to a point indicated by the chain line in FIG. 6, there will be produced two equally divided sections in the circular pattern shown in FIG. 7 by the action of light rays having an L path and an $l$ path, respectively. The first half of the divided sections appears white ($a$) and the other half red ($b$), differences in the proportion thereof representing the amount of fuel inventory in the reservoir of the lighter.

The two embodiments hereinabove discussed employ a transparent member having a conical configuration, but this transparent member may be of other suitable shapes including a hexagonal cone 39 as shown in FIG. 8 and a polyhedron 40 having planes of different angles as shown in FIG. 9. Both of these shapes have the advantage that the light is subjected to refraction in various forms and presents a greater brightness at the surface of the transparent member 21 than obtainable with the conical member, and emergence of the red color is effected in a manner similar to the case of the conical device.

FIGS. 10 and 11 illustrate another modification of the fuel level indicating device according to the invention, which is designed to give a blue color indication when there is no fuel in the reservoir of the lighter and a red color indication in the presence of fuel therein.

The transparent member 21a consists of a conical block having indicator plate 22b mounted thereon. The indicator device of this arrangement is inserted into the reservoir 17 of the lighter with the indicator plate 22b and the inclined surface 24a aligned in parallel as shown, and suitable apertures 37a are provided to establish communication between reservoir 17 and the interior of housing 38a. With this construction, when there is no fuel inventory in the reservoir 17, the lower part of the surface 24a appears optically separate from the indicator plate 22a due to the presence of gap 27a therebetween and hence, serves to refract the light from the transparent member 21a upwardly in L fashion. In such instance, the other indicator plate 22b presents a blue color ($c$) on the exposed surface of the transparent member 21a as it reaches the light refracted from the surface 24a. Conversely, when there is fuel in the reservoir 17, the lower part of the surface 24a disappears due to the presence of liquid fuel in the space 27a with the result that the indicator plate 22a and the transparent member 21a appear optically as if they were one and the same member and the incidence of light is held in $l$ fashion, i.e., without being refracted. Thus, thereby the red color ($b$) of the indicator plate 22a is visible on the exposed surface of the transparent member 21a. In this embodiment, it is possible to know whether or not there is fuel in the reservoir 17 of the lighter by looking at the color pattern appearing on the exposed transparent member, or to check the reservoir for fuel inventory when the level is reduced to a point designated at the chain line in FIG. 10 by comparing the proportion of the two different colors appearing simultaneously on the transparent member 21a as shown in FIG. 11.

Since certain changes may be made in the above described construction and different embodiments may be made of the invention without departing from the spirit and scope thereof, it is intended that all the matter contained in the above description and shown in the accompanying drawings shall be considered as illustrative in nature and not in a limiting sense.

What is claimed is:

1. In combination, a vessel adapted to contain fuel, an opening in the exterior of said vessel for receiving an optical fuel level indicator therein, such indicator comprising:

a transparent member adapted to refract light rays impinging thereupon, said member including:
an enlarged annular portion, and
a body portion having a plurality of inclined peripheral surfaces extending inwardly from said annular portion and converging at a tip segment, said body portion forming a hexagon when viewed in a plane parallel to said annular portion, mounting means for securing said transparent member in operative position within the opening in said vessel, said mounting means including:
socket means for engaging the annular portion of said transparent member, and
a housing extending inwardly from said socket means, said housing having apertures to permit fuel to pass therethrough, and a full colored indicator plate secured to a wall of said housing at a point spaced from the tip of said transparent member, whereby the amount of color reflected from the indicator plate is directly related to the level of fuel contained within the vessel.

2. In combination, a vessel adapted to contain fuel, an opening in the exterior of said vessel for receiving an optical fuel level indicator therein, such indicator comprising:
  a transparent member adapted to refract light rays impinging thereupon, said member including:
    an enlarged annular portion, and
    a body portion having a plurality of inclined peripheral surfaces extending inwardly from said annular portion and converging at a tip segment, said body portion forming a polyhedron when viewed in a plane parallel to said annular portion,
  mounting means for securing said transparent member in operative position within the opening in said vessel, said mounting means including:
    socket means for engaging the annular portion of said transparent member, and
    a housing extending inwardly from said socket means, said housing having apertures to permit fuel to pass therethrough, and
    a fully colored indicator plate secured to a wall of said housing at a point spaced from the tip of said transparent member, whereby the amount of color reflected from the indicator plate is directly related to the level of fuel contained within the vessel.

References Cited

UNITED STATES PATENTS

| | | | |
|---|---|---|---|
| 461,370 | 10/1891 | Seidensticker | 73—327 |
| 1,501,504 | 7/1924 | Traux | 73—327 |
| 1,883,971 | 10/1932 | Kryzanowsky | 73—327 |
| 2,943,530 | 7/1960 | Nagel | 73—327 X |
| 3,049,011 | 8/1962 | Campbell | 73—327 |
| 3,123,971 | 3/1964 | Atwood et al. | 73—327 X |

LOUIS R. PRINCE, *Primary Examiner.*

D. M. YASICH, *Assistant Examiner.*